United States Patent
Arita et al.

(10) Patent No.: US 11,687,113 B2
(45) Date of Patent: Jun. 27, 2023

(54) POINTING DEVICE

(71) Applicant: FUJITSU COMPONENT LIMITED, Tokyo (JP)

(72) Inventors: Takashi Arita, Tokyo (JP); Tamotsu Koike, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 17/692,716

(22) Filed: Mar. 11, 2022

(65) Prior Publication Data

US 2022/0197327 A1 Jun. 23, 2022

Related U.S. Application Data

(63) Continuation of application No. 16/674,534, filed on Nov. 5, 2019, now Pat. No. 11,307,607.

(30) Foreign Application Priority Data

Dec. 28, 2018 (JP) .................................. 2018-246891

(51) Int. Cl.
*G05G 9/047* (2006.01)
*G06F 3/03* (2006.01)

(52) U.S. Cl.
CPC ....... *G05G 9/04792* (2013.01); *G06F 3/0312* (2013.01); *G05G 2009/04781* (2013.01)

(58) Field of Classification Search
CPC ..... G06F 3/0312; G06F 3/0344; G06F 3/0362
USPC ................................................. 345/156, 163
See application file for complete search history.

(56) References Cited

U.S. PATENT DOCUMENTS

| 6,266,046 | B1 | 7/2001 | Arita | |
| 6,636,197 | B1 * | 10/2003 | Goldenberg | G06F 3/016 345/184 |
| 7,182,691 | B1 * | 2/2007 | Schena | G06F 3/016 345/161 |
| 7,302,761 | B2 | 12/2007 | Loomis et al. | |

(Continued)

FOREIGN PATENT DOCUMENTS

| CN | 1604256 | 4/2005 |
| CN | 100361246 | 1/2008 |

(Continued)

OTHER PUBLICATIONS

Office Action, dated Apr. 1, 2021, in U.S. Appl. No. 16/674,534 (13 pp.).

(Continued)

*Primary Examiner* — Calvin C Ma
(74) *Attorney, Agent, or Firm* — Staas & Halsey LLP

(57) ABSTRACT

A pointing device includes: a substrate; an operation member that is provided tiltably with respect to the substrate, and includes a protrusion protruded from one of an inner wall and an outer wall; and a rotation member that is provided rotatably on the substrate, and includes a hole which the protrusion enters when the rotation member overlaps the operation member; wherein the rotation member rotates in conjunction with the operation member when the protrusion contacts an edge of the hole according to rotation of the operation member, wherein the hole is formed in a range in which the protrusion is movable by tilt of the operation member.

1 Claim, 19 Drawing Sheets

(56) References Cited

U.S. PATENT DOCUMENTS

| | | | | |
|---|---|---|---|---|
| 7,764,268 | B2 * | 7/2010 | Gomez | G06F 3/016 345/157 |
| 2002/0190945 | A1 | 12/2002 | Arita et al. | |
| 2005/0067263 | A1 | 3/2005 | Kawamura et al. | |
| 2006/0281550 | A1 | 12/2006 | Schena | |
| 2009/0183978 | A1 | 7/2009 | Asada | |
| 2012/0260762 | A1 | 10/2012 | Yamazaki et al. | |
| 2013/0112532 | A1 | 5/2013 | Suzuki | |
| 2014/0043303 | A1 | 2/2014 | Baker et al. | |
| 2018/0099220 | A1 | 4/2018 | Hayasaka et al. | |
| 2018/0115304 | A1 | 4/2018 | Takada et al. | |
| 2019/0050069 | A1 | 2/2019 | Kannari | |
| 2020/0051764 | A1 * | 2/2020 | Hwang | H01H 25/006 |

FOREIGN PATENT DOCUMENTS

| | | |
|---|---|---|
| CN | 101494132 | 7/2009 |
| CN | 102479638 | 5/2012 |
| CN | 102722237 | 10/2012 |
| CN | 103000434 | 3/2013 |
| CN | 103094018 | 5/2013 |
| CN | 104380415 | 2/2015 |
| CN | 107683167 | 2/2018 |
| CN | 107978476 | 5/2018 |
| CN | 109074174 | 12/2018 |
| JP | 11-353109 | 12/1999 |
| JP | 2003-15814 | 1/2003 |
| JP | 2006-139790 | 6/2006 |
| JP | 2017-98123 | 6/2017 |
| JP | 2017-151990 | 8/2017 |
| JP | 2017-152038 | 8/2017 |

OTHER PUBLICATIONS

Notice of Allowance, dated Dec. 15, 2021, in U.S. Appl. No. 16/674,534 (9 pp.).

U.S. Appl. No. 16/674,534, filed Nov. 5, 2019, Takashi Arita et al., Fujitsu Component Limited.

First Office Action, dated Dec. 5, 2022, in corresponding Chinese Patent Application No. 201911341453.X (23 pp.).

Notice of Reasons for Refusal, dated Oct. 4, 2022, in Japanese Patent Application No. 2018-246891 (8 pp.).

* cited by examiner

POINTING DEVICE

CROSS-REFERENCE TO RELATED APPLICATION

This application is a continuation of U.S. patent application Ser. No. 16/674,534 filed on Nov. 5, 2019, which is based upon and claims the benefit of priority of the prior Japanese Patent Application No. 2018-246891 filed on Dec. 28, 2018, the entire contents of each of which are incorporated herein by reference.

FIELD

A certain aspect of the embodiments is related to a pointing device.

BACKGROUND

There are pointing devices for inputting coordinates to various devices such as computers, medical devices and machine tools (e.g. see Japanese Laid-open Patent Publications Nos. 2017-152038 and 2017-151990). When drawing is performed using a computer, the pointing device is required not only to merely move a pointer but also to select an operation menu using the pointer.

In a conventional endoscope, when the operation to move the small camera in two axial directions was possible, the performance was sufficient. However, since the endoscope in recent years has a built-in catheter, it is required to enable more complicated operations with just fingertips. Also in many robots which are examples of the machine tools, it is required to perform the complicated operations. Further, also in devices other than those described above, it is required to enable the complicated operations using the pointing device.

SUMMARY

According to a first aspect of the present disclosure, there is provided a pointing device including: a substrate; an operation member that is provided tiltably with respect to the substrate, and includes a protrusion protruded from one of an inner wall and an outer wall; and a rotation member that is provided rotatably on the substrate, and includes a hole which the protrusion enters when the rotation member overlaps the operation member; wherein the rotation member rotates in conjunction with the operation member when the protrusion contacts an edge of the hole according to rotation of the operation member, wherein the hole is formed in a range in which the protrusion is movable by tilt of the operation member.

According to a second aspect of the present disclosure, there is provided a pointing device including: a substrate; an operation member that includes a base with a first protrusion, and is provided tiltably with respect to the substrate; and a housing member that biases the first protrusion toward the substrate and houses the base; wherein a second protrusion is provided on an inner peripheral surface of the housing member so as to avoid a range in which the first protrusion is movable by tilt of the operation member, wherein the housing member rotates in conjunction with the operation member when the first protrusion contacts the second protrusion according to rotation of the operation member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The pointing device needs to be provided with a tiltable knob for specifying coordinates in the two axial directions, and a rotary encoder in order to detect a rotational amount of the knob when the knob is rotated. For this reason, the structure of the pointing device is complicated, and it is therefore difficult to realize tilt and rotation operations with high accuracy.

It is an object of the present disclosure to provide a pointing device that can realize tilt and rotation operations with high accuracy without using complicated structure.

Figure 1:
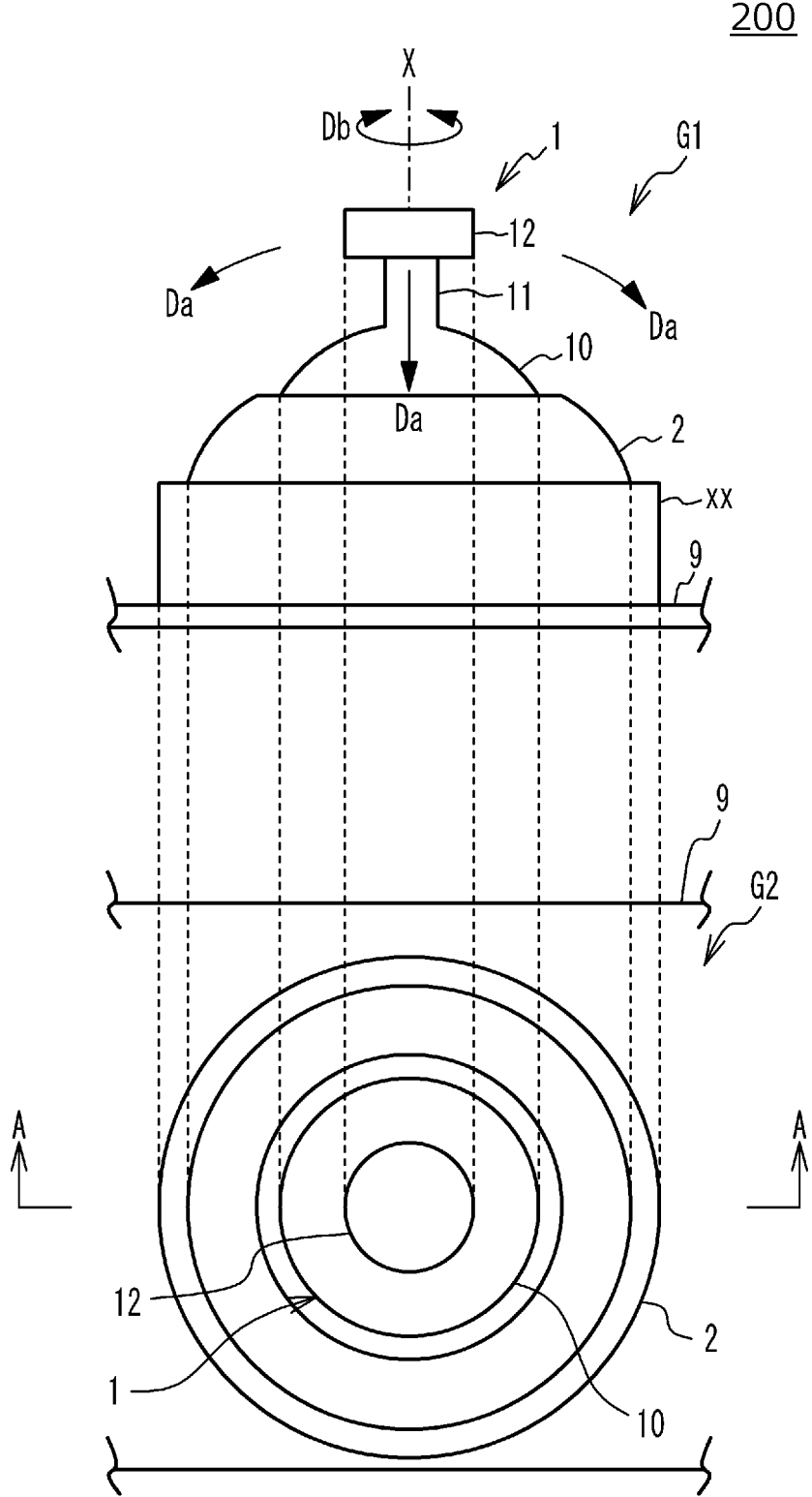
FIG. 1 is an appearance diagram illustrating an example of a pointing device.
Figure 2:
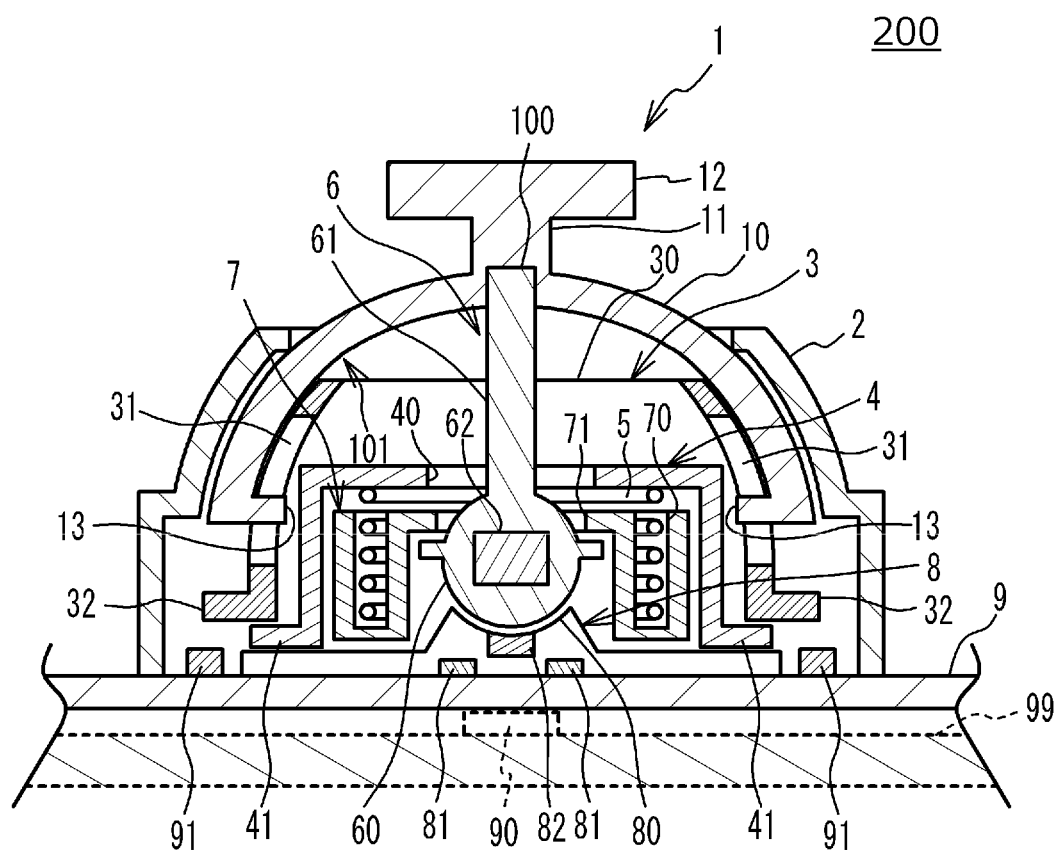
FIG. 2 is a cross-section diagram illustrating the pointing device.
Figure 3:
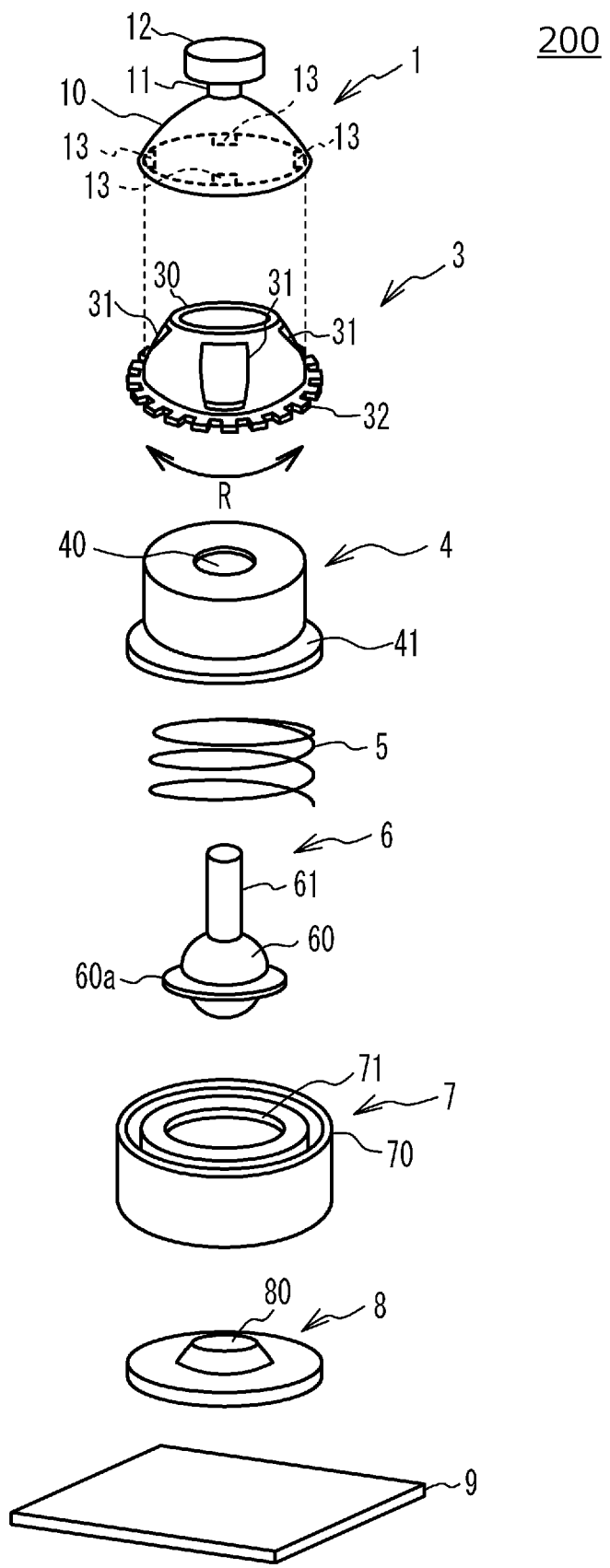
FIG. 3 is an exploded perspective view illustrating the pointing device.

FIG. 1 is an appearance diagram illustrating an example of a pointing device 200. A code G1 indicates a side surface of the pointing device 200, and a code G2 indicates an upper surface thereof. FIG. 2 is a cross-section diagram of the pointing device 200 taken along a line A-A in FIG. 1. FIG. 3 is an exploded perspective view illustrating the pointing device 200. In FIG. 3, a case 2 is omitted. The pointing device 200 is used for a computer in which the coordinates are input, a medical device such as an endoscope and a catheter that requires complicated operations, a machine tool such as a robot, a controller for a video game, or the like.

The pointing device 200 includes an operation part 1 to be operated by an operator, the case 2, a rotation part 3, a cover 4, a spring 5, a support part 6, a slider 7, a receiving part 8, and a substrate 9. The rotation part 3, the cover 4, the spring 5, the support part 6, the slider 7 and the receiving part 8 are housed in the case 2 fixed on the substrate 9. Examples of the material for the pointing device 200 include plastic and The operation part 1 is an example of an operation member. The operation part 1 includes a hemispherical dome 10, a shaft 11 extending upward from an apex of the dome 10, and a knob 12 provided at an end of the shaft 11. The operation part 1 and the case 2 are provided on the substrate 9. The substrate 9 is provided with an electric circuit for detecting an operation input to the operation part 1.

The operator can tilt the operation part 1 in any direction at any angle as indicated by arrows Da while touching the knob 12 with the fingertips, for example. The operator can specify coordinates by moving a pointer displayed on the screen with an operation of the knob 12.

Further, the operator can rotate the operation part 1 around an axis X of the shall 11 as indicated by an arrow Db while holding the knob 12 with the fingertips. Thereby, the operator can select an operation menu displayed on a screen, for example. Each of the shaft 11 and the knob 12 has a cylindrical shape as an example, but may be a polygonal column, for example.

The rotation part 3 is an example of an rotation member, and is formed in a cylindrical shape having a skirt-shaped cross section. The rotation part 3 is not fixed with respect to the case 2, and is provided rotatably in a direction R along the substrate 9 according to the rotation operation of the operation part 1. The rotation part 3 has, on an upper part thereof, a circular opening 30 through which the support part 6 is inserted, and has four openings 31 arranged at equal intervals on an outer peripheral surface, for example.

A recessed and projecting part 32 is provided along the direction R on a skirt of the rotation part 3. The recessed and projecting part 32 is used to detect a rotation amount of the rotation part 3, that is, a rotation angle by optical sensors 91 mounted on the substrate 9.

The dome 10 overlaps the rotation part 3 so as to cover the rotation part 3 from the outside. The four protrusions 13 that enter the openings 31 when the dome 10 overlaps the rotation part 3 are provided at a lower end of an inner wall of the dome 10. The positions of the protrusions 13 are not limited as long as each of the protrusions 13 enters the opening 31.

Figure 4:
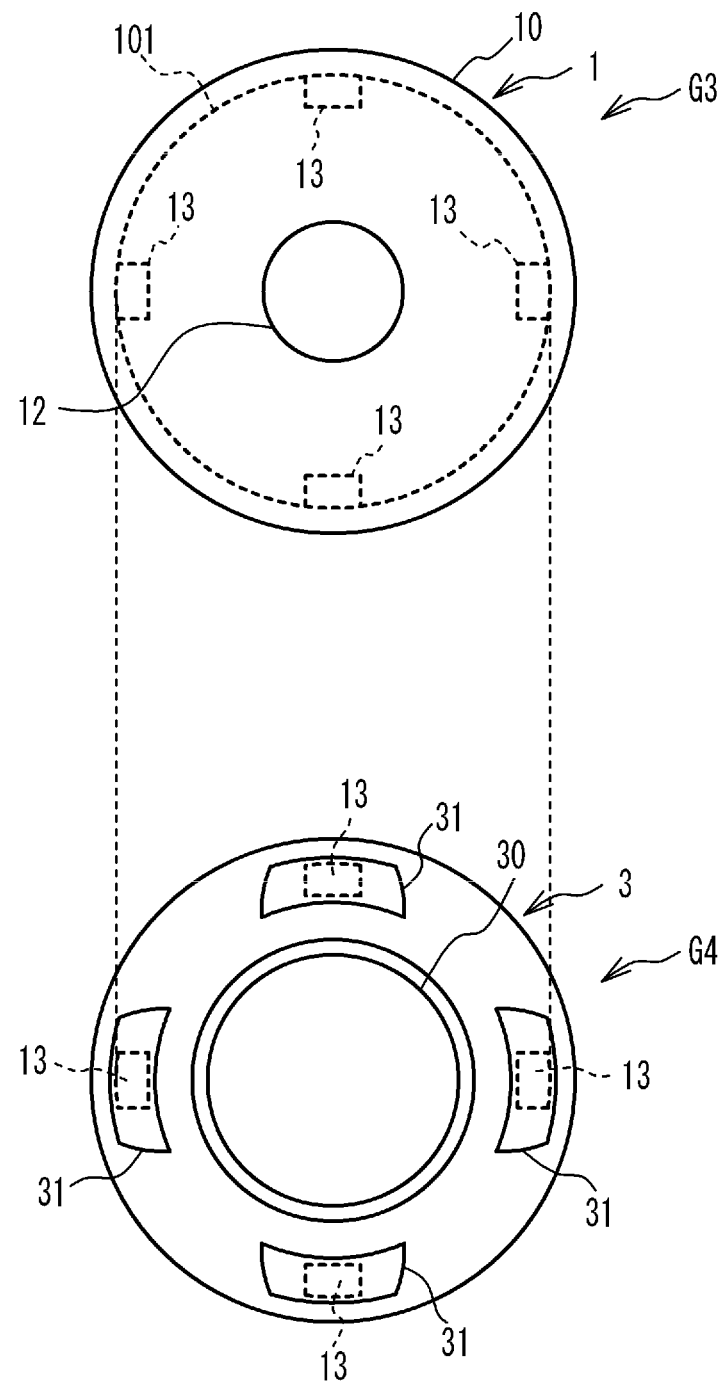
FIG. 4 is a top view illustrating a positional relationship between protrusions and side surface openings.

FIG. 4 is a top view illustrating a positional relationship between the protrusions 13 and the openings 31. A code G3 indicates an upper surface of the dome 10, and a code G4 indicates an upper surface of the rotation part 3. In FIG. 4, the operation part 1 is not tilted with respect to the substrate 9.

The protrusions 13 protrude from an inner wall 101 of the dome 10 toward the center of the dome 10, and are provided on the inner wall 101 at equal intervals. As an example, the protrusions 13 are provided every 90 degrees. When the dome 10 overlaps the rotation part 3, each protrusion 13 enters one of the openings 31. Since the protrusion 13 contacts an edge of the opening 31 at the time of the rotation of the operation part 1, the rotation part 3 rotates in conjunction with the operation part 1. Although the shape of the protrusion 13 in this example is a substantially rectangular parallelepiped, it is not limited to this.

The cover 4 is fixed on the receiving part 8 inside the rotation part 3. The spring 5, the support part 6 and the slider 7 are housed in the cover 4.

The support part 6 includes a spherical base 60, and a rod-like coupling part 61 that protrudes from the base 60. The base 60 is provided with a flange 60a projecting outside. Since one end of the coupling part 61 is inserted and fixed in a fixing hole 100 at the apex of the dome 10, the support part 6 is tilted according to the tilt of the operation part 1, and rotates according to the rotation of the operation part 1. Although the fixing hole 100 and the coupling part 61 are fixed by fitting or adhesion, a fixing method is not limited to this. The base 60 is preferably spherical in order to ensure easiness of the tilt and the rotation of the support part 6, but may have other shape as long as the tilt and the rotation of the support part 6 are not hindered.

The base 60 is placed in a recess 80 formed on the receiving part 8. A surface of the recess 80 is formed so as to match a curved surface of the base 60. Since surface shapes of the base 60 and the recess 80 are matched each other, the base 60 is stably supported by the recess 80 regardless the rotation or tilt of the support part 6. Thereby, the support part 6 can support the operation part 1 even when the operation part 1 tilts or rotates.

The slider 7 is a double cylindrical member coupled on one end side thereof and is tilted with respect to the substrate 9 in accordance with the tilt of the operation part 1. A groove 70 storing the spring 5 is provided along an outer periphery of the slider 7. An end of the spring 5 near the dome 10 is in contact with a lower surface of the cover 4, and the slider 7 is biased toward the substrate 9 by the spring 5.

An opening 71 that partially exposes the base 60 is provided on an end of the slider 7 near the dome 10. The coupling part 61 extends from the base 60 toward the dome 10 through an opening 40 formed on an upper surface of the cover 4.

The cover 4 has a substantially cylindrical shape, and has a flange 41 projecting outwardly at a lower end thereof. The cover 4 is overlapped on the receiving part 8, and the receiving part 8 is overlapped on the substrate 9. The cover 4 is fixed to the substrate 9 along with the receiving part 8. The cover 4 is fixed by fitting or adhesion, but the fixing method is not limited to this.

The base 60 is held on the recess 80, and the support part 6 is tilted according to the tilt of the operation part 1. At this time, the flange 60a contacts the edge of the opening 71 and tilts the slider 7 in accordance with the tilt of the support part 6.

Since the slider 7 is biased toward the substrate 9 by the spring 5, the slider 7 returns to an original posture when the operator releases a hand from the operation part 1. Thereby, the flange 60a also returns to a position before the tilt, and the operation part 1 also returns to a position before the tilt. The support part 6 holds the operation part 1 in a predetermined posture by a biasing force of the spring 5.

A permanent magnet 62 is embedded in the base 60. A plurality of magnetoelectric conversion elements 81 are provided on the substrate 9 below the recess 80 of the receiving part 8. A magnetic field detected by the magnetoelectric conversion element 81 changes according to the change in a positional relationship between the permanent magnet 62 and the magnetoelectric conversion element 81 due to the tilt of the base 60. Therefore, each magnetoelectric conversion element 81 detects the change in the magnetic field of the permanent magnet 62 to obtain the tilt angle of the base 60.

In order to detect an operation of pushing the operation part 1 toward the substrate 9, a pressure-sensitive sensor 82 may be provided at the bottom of the recess 80. The sensor 82 detects a pressure received from the base 60. Since the sensor 82 detects the pressure pushing the operation part 1, the sensor 82 can be used to detect an operation for confirming an input, for example. The pressure-sensitive sensor 82 is an example of a second detector.

A means for detecting the pressure pushing the operation part 1 is not limited to the sensor 82, and an electric switch 90 may be provided in a housing below the substrate 9, for example. The electric switch 90 is another example of the second detector.

The optical sensors 91 are provided on the substrate 9 so as to be positioned below the recessed and projecting part 32. The optical sensors 91 optically detect the movement of the recessed and projecting part 32 by the rotation of the rotation part 3 and generate pulses according to a detection of the recessed and projecting part 32. The pulses generated by the optical sensors 91 are used for calculating the rotation amount of the rotation part 3.

A description will be given of an operation for tilting the operation part 1.

Figure 5:
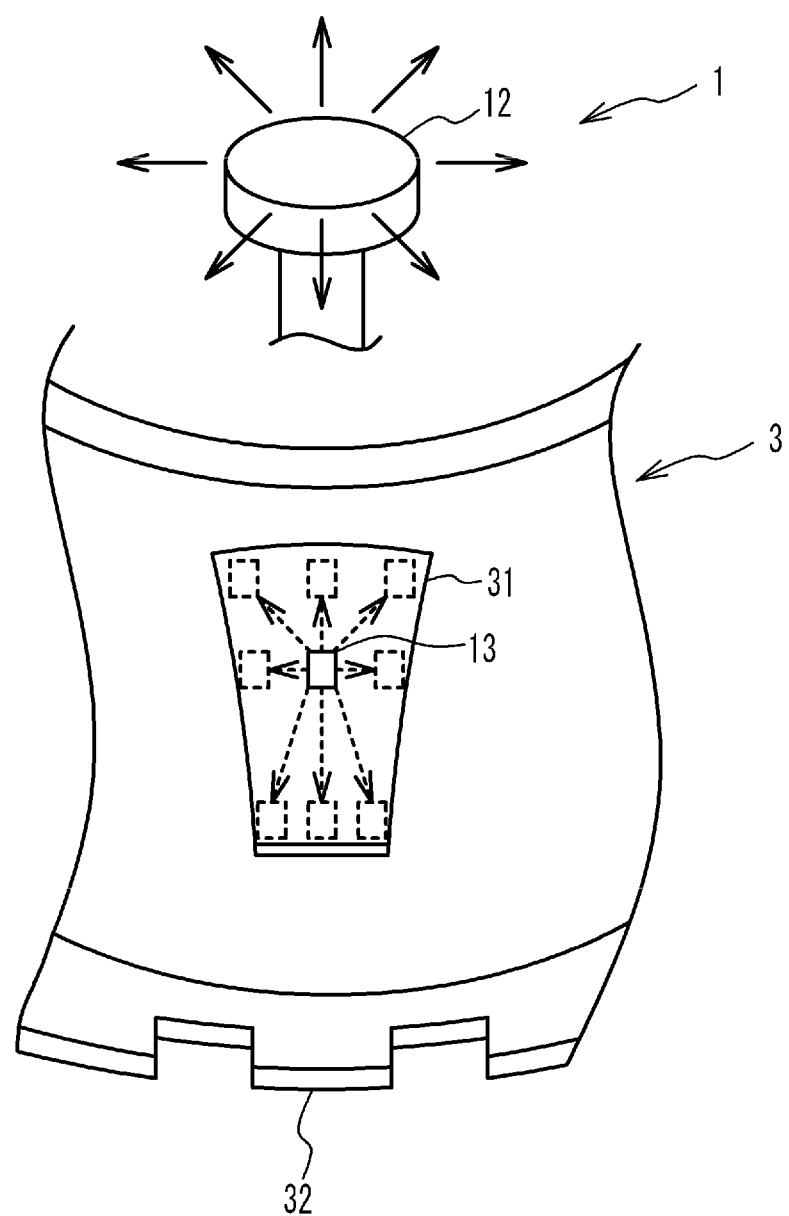
FIG. 5 is a diagram illustrating the movement of a protrusion in a side surface opening when an operation member is tilted.

FIG. 5 illustrates the movement of the protrusion 13 in the opening 31 when the operation part 1 is tilted. The operator can tilt the knob 12 in any direction as indicated by solid arrows. When the knob 12 is tilted, the dome 10 is also tilted, and the protrusion 13 therefore moves in the opening 31 as indicated by dotted arrows.

The opening 31 is formed in a range in which the protrusion 13 is movable by the tilt of the operation part 1. Therefore, the protrusion 13 does not contact the edge of the opening 31 and does not push the opening 31 even if the knob 12 is tilted to a movable limit. It is suppressed that the protrusion 13 pushes the edge of the opening 31 by the tilt of the operation part 1 and the rotation part 3 rotates.

If the rotation part 3 rotates by the tilt of the operation part 1, the recessed and projecting part 32 also rotates and the rotation may be erroneously detected, since the recessed and projecting part 32 is used for detecting the rotation of the rotation part 3. However, since the protrusion 13 does not contact the edge of the opening 31 when the operation part 1 tilts, the rotation of the rotation part 3 by the tilt of the operation part 1 is suppressed, and erroneous detection of the rotation in tilting the operation part 1 is suppressed.

A description will be given of an operation for rotating the operation part 1.

Figure 6:
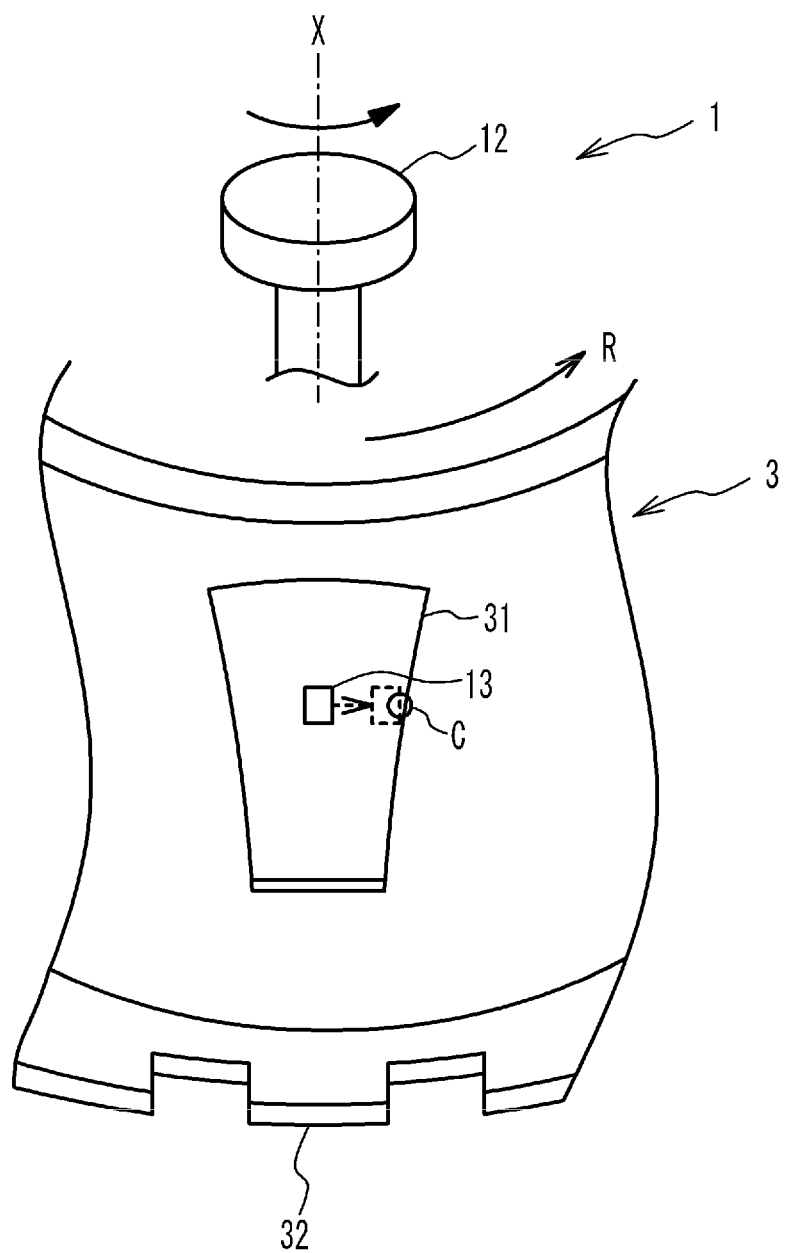
FIG. 6 is a diagram illustrating the movement of the protrusion in the side surface opening when the operation member is rotated.

FIG. 6 illustrates the movement of the protrusion 13 in the opening 31 when the operation part 1 is rotated. The operator can rotate the knob 12 about the axis X as indicated by an arrow regardless of a tilted state of the operation part 1. When the knob 12 is rotated, the dome 10 is also rotated, and the protrusion 13 therefore moves in the opening 31 as indicated by a dotted arrow.

At this time, the protrusion 13 contacts the edge of the opening 31 as indicated by a code C. Therefore, the rotation part 3 pushed by the protrusion 13 in conjunction with the rotation of the operation part 1 rotates in the direction R. The rotation of the rotation part 3 is detected by the optical sensors 91.

Figure 7:
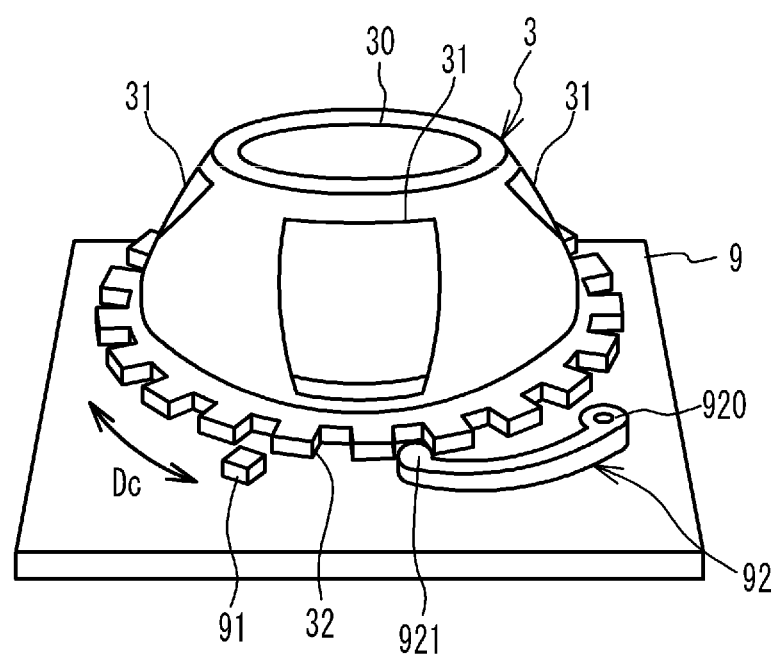
FIG. 7 is a perspective view illustrating a rotation member on a substrate.

FIG. 7 illustrates the rotation part 3 on the substrate 9. The optical sensor 91 is mounted on the substrate 9 so as to be located below the recessed and projecting part 32 of the rotation part 3.

The optical sensor 91 turns on and off an output signal according to light received by a light receiving element. When the recessed and projecting part 32 is rotated along with the rotation of the rotation part 3 as shown by Dc, a recess and a projection in the recessed and projecting part 32 are alternately positioned on the optical sensor 91, and therefore light receiving states of the light receiving element are alternately changed. The optical sensor 91 generates a pulse signal corresponding to the rotation of the recessed and projecting part 32 based on the detection of on/off of the light by the light receiving element, and outputs it to an external circuit (not shown). The external circuit calculates the rotation amount, that is, the rotation angle of the rotation part 3 based on the pulse signal.

A latch 92 is provided on the substrate 9. The latch 92 is an elastic rod-like member that is curved from a root 920 fixed to the substrate 9 to a tip 921. The tip 921 moves freely along a plate surface of the substrate 9. The tip 921 expands in a circular shape, and is biased to engage with the recessed and projecting part 32.

When the recessed and projecting part 32 rotates according to the rotation of the rotation part 3, a sound in which the latch 92 hits the recess of the recessed and projecting part 32 is generated. Since a force changes when the tip 921 enters and exits the recess, the operator can get an operation feeling when rotating the operation part 1.

Figure 8:
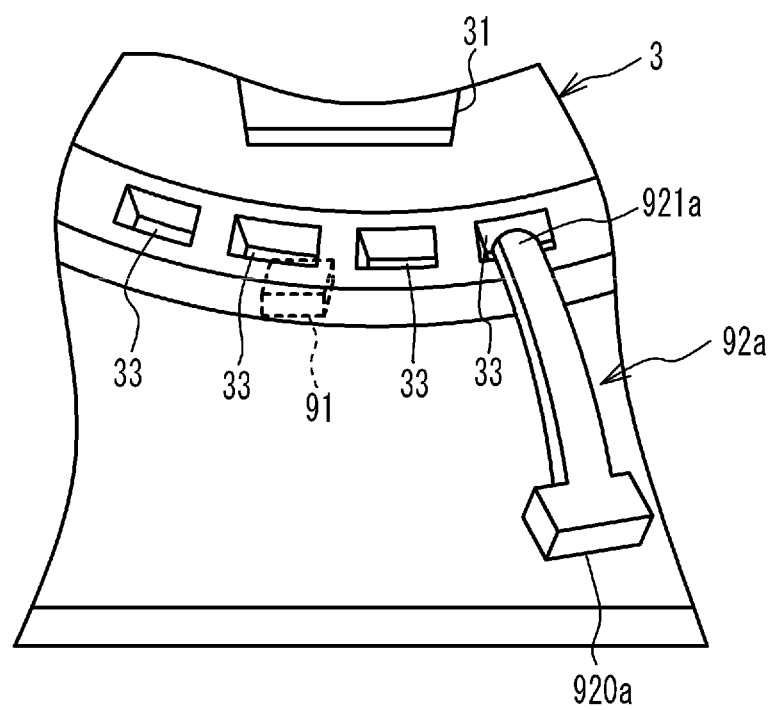
FIG. 8 is a diagram illustrating a periphery of a bottom of the rotation member according to a variation.

The rotation part 3 may be provided with holes 33 instead of the recessed and projecting part 32. FIG. 8 illustrates a periphery of a bottom of the rotation part 3 according to a variation. The holes 33 are provided on the rotation part 3 of FIG. 8 along the rotation direction of the rotation part 3. When the holes 33 rotate, light is alternately input and blocked with respect to the optical sensor 91, and the optical sensor 91 outputs the pulse signal according to the rotation of the rotation part 3. The external circuit can detect the rotation amount of the rotation part 3 based on the pulse signal.

The substrate 9 is provided with a latch 92*a* which is an elastic rod-like member curved from a root 920*a* to a tip 921*a*. The root 920*a* is fixed to the substrate 9, and the tip 921*a* moves freely in a vertical direction with respect to the substrate 9. The tip 921*a* expands in a substantially circular shape, and is biased to engage with any one of the holes 33.

When the holes 33 rotate according to the rotation of the rotation part 3, a sound in which the latch 92*a* hits the edges of the holes 33 is generated. The operator can get the operation feeling by the change in sound and force when rotating the operation part 1. The latches 92 and 92*a* are optional components for the pointing device 200.

The rotation part 3 may be provided with recesses 31*a* instead of the openings 31 as described later.

Figure 9:
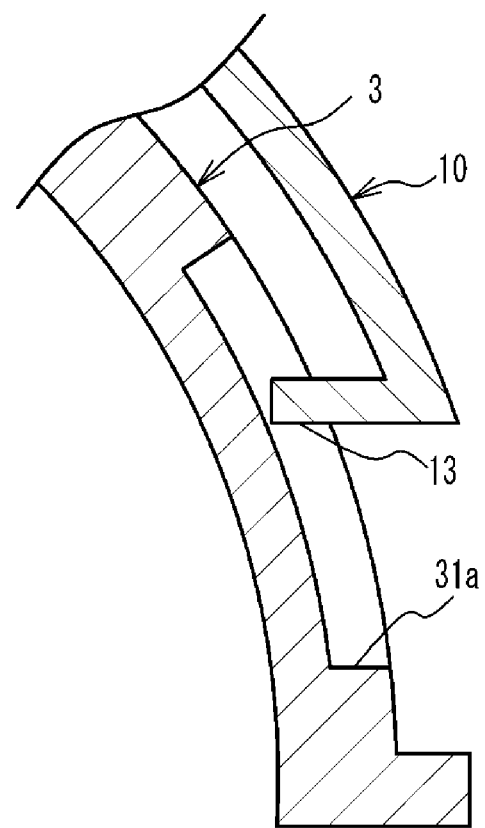
FIG. 9 is a cross-section diagram illustrating a structure in which the rotation member and a dome overlap each other.

FIG. 9 is a cross-section diagram illustrating a structure in which the rotation part 3 and the dome 10 overlap each other. The rotation part 3 is provided with the recesses 31*a*. The opening 31 is a through hole without a bottom, but the recess 31*a* is a hole with a bottom. Therefore, the strength of the rotation part 3 having the recess 31*a* is improved as compared with the rotation part 3 having the opening 31. The opening 31 and the recess 31*a* are examples of the hole.

In the pointing device 200, the dome 10 covers the rotation part 3 from the outside. Therefore, an effect that dusts are hard to enter inside the rotation part 3 is obtained.

That is, the pointing device 200 can prevent dusts from entering the inside of the rotation part 3.

Figure 10:
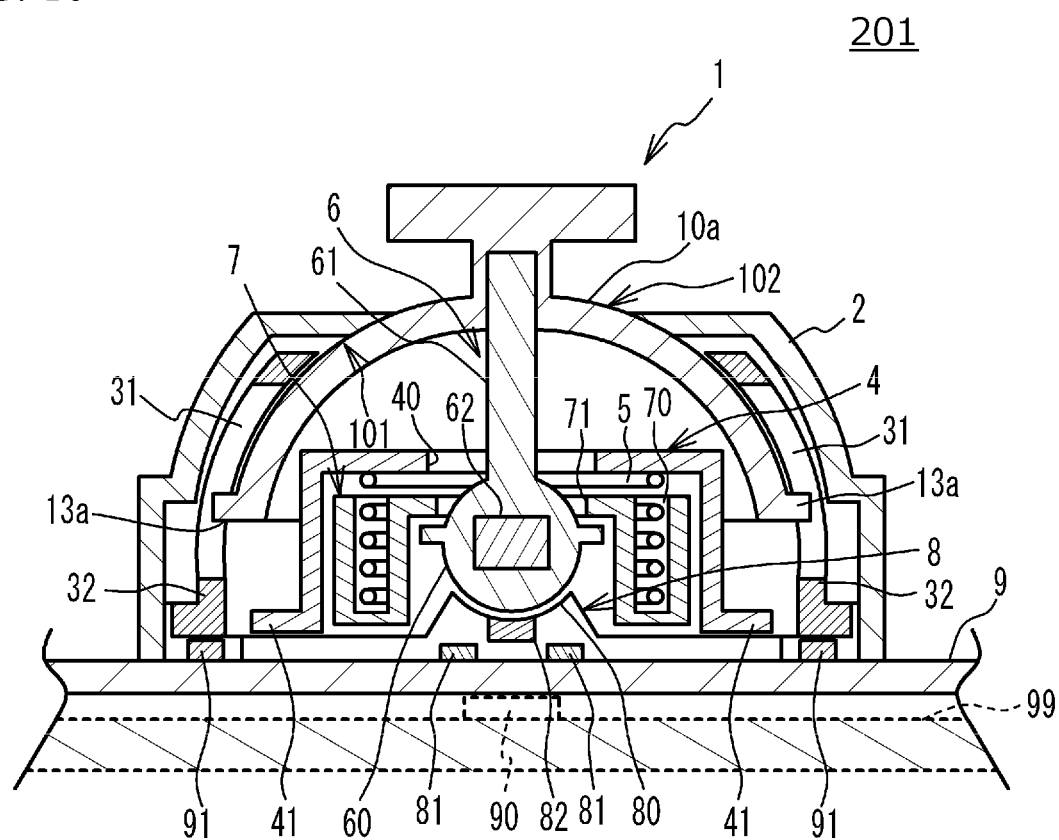
FIG. 10 is a cross-section diagram illustrating another example of the pointing device.

The rotation part 3 may cover the dome 10 from the outside. FIG. 10 is a cross-section diagram illustrating a pointing device 201. In FIG. 10, the same elements as in FIG. 2 are denoted by the same reference numerals, and description thereof is omitted. The appearance of the pointing device 201 is substantially the same as that of the pointing device 200 of FIG. 1.

A dome 10a overlaps the inside of the rotation part 3 unlike the dome 10. Since an outer wall 102 of the dome 10a faces the inner peripheral surface of the rotation part 3, protrusions 13a are provided so as to protrude outward from the outer wall 102. The protrusions 13a are provided every 90 degrees as an example. The protrusions 13a enter the openings 31 when the dome 10a overlaps the rotation part 3.

Figure 11:
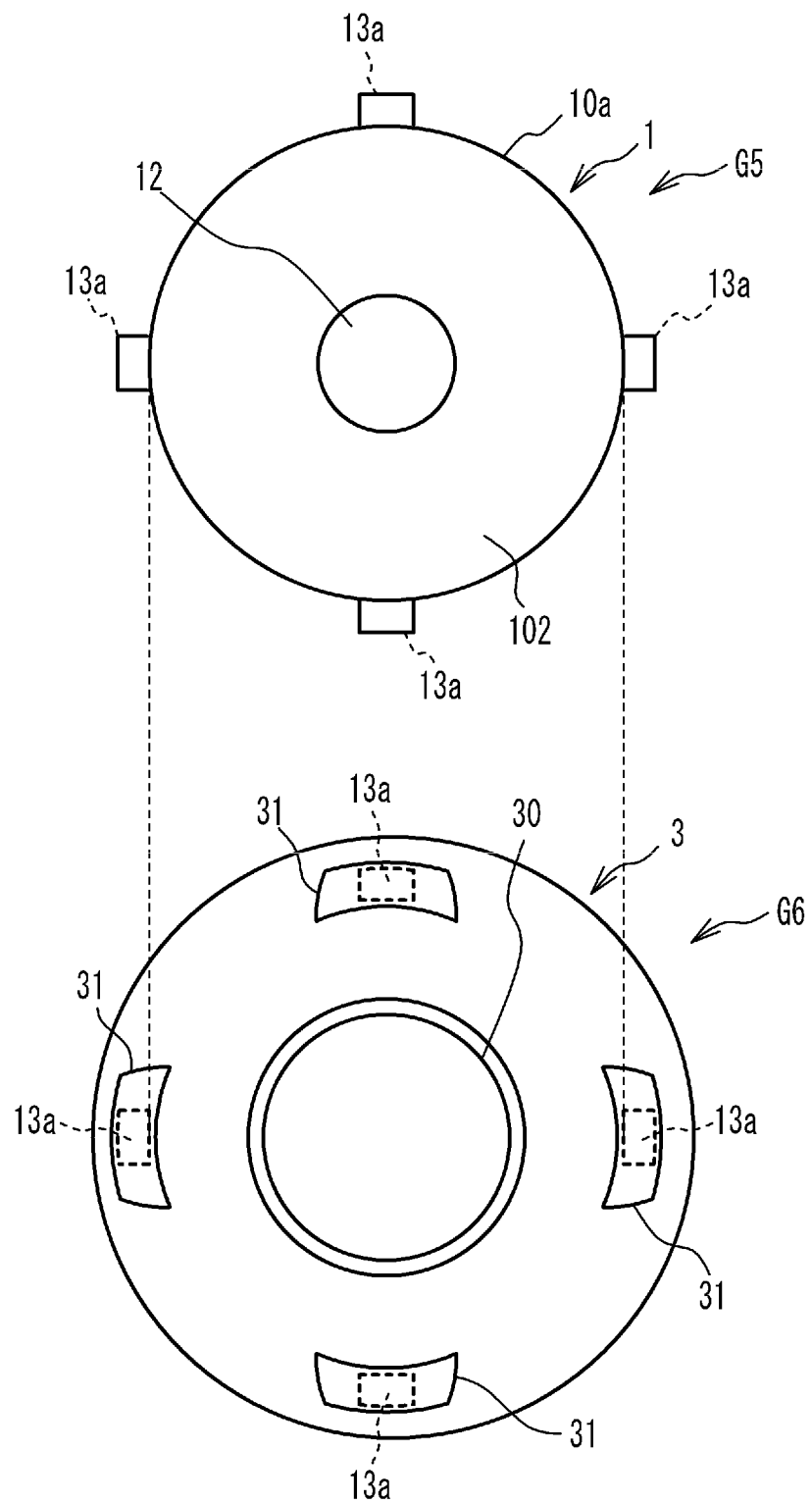
FIG. 11 is a top view illustrating the positional relationship between the protrusions and the side surface openings.

FIG. 11 is a top view illustrating the positional relationship between the protrusions 13a and the openings 31. A code G5 indicates the upper surface of the dome 10a, and a code G6 indicates the upper surface of the rotation part 3. FIG. 11 illustrates a state where the operation part 1 is not tilted with respect to the substrate 9.

The protrusions 13a protrude outward from the outer wall 102, and are provided at equal intervals. When the dome 10a is overlapped on the rotation part 3, the protrusions 13a enter the openings 31. Since each protrusion 13a contacts the edge of the opening 31 as in the case of FIG. 6 at the time of the rotation of the operation part 1, the rotation part 3 rotates in conjunction with the operation part 1.

When the operation part 1 is tilted, each protrusion 13a moves in the opening 31 as in the case of FIG. 5. Since the opening 31 is formed in a range in which the protrusion 13a is movable by the tilt of the operation part 1, the protrusion 13 does not contact the edge of the opening 31 even if the knob 12 is tilted to the movable limit. Therefore, the rotation of the rotation part 3 by the tilt of the operation part 1 is suppressed, and the erroneous detection of the rotation in tilting the operation part 1 is also suppressed.

This effect can be similarly obtained even when recesses 31b is provided in the rotation part 3 instead of the opening 31 as described later.

Figure 12:
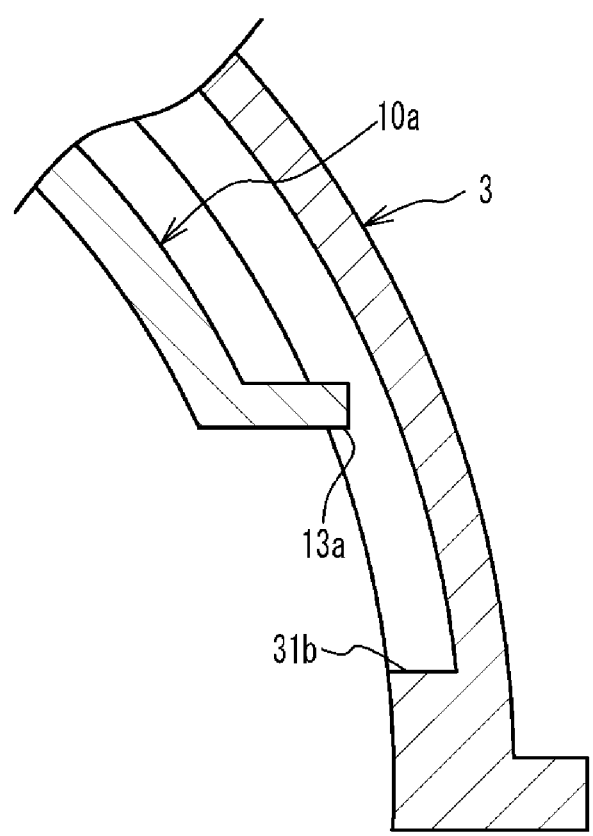
FIG. 12 is a cross-section diagram illustrating the structure in which the rotation member and the dome overlap each other.
Figure 13A:
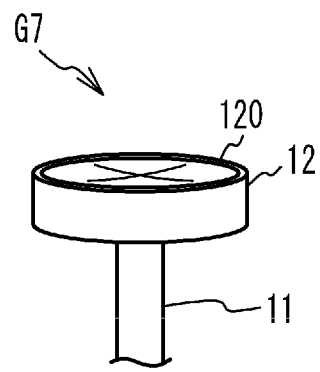
FIGS. 13A to 13E are perspective views illustrating examples of a knob.
Figure 13B:
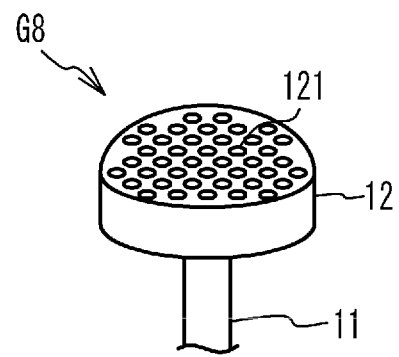
Figure 13C:
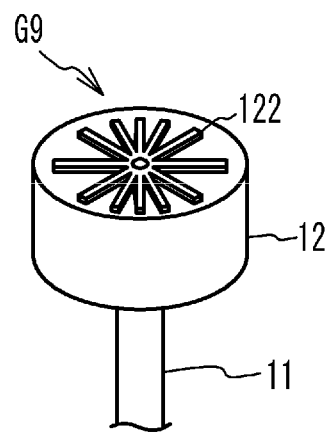
Figure 13D:
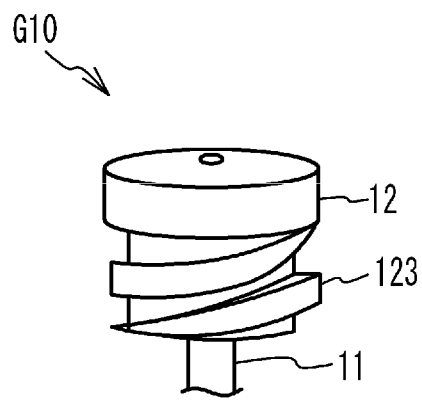
Figure 13E:
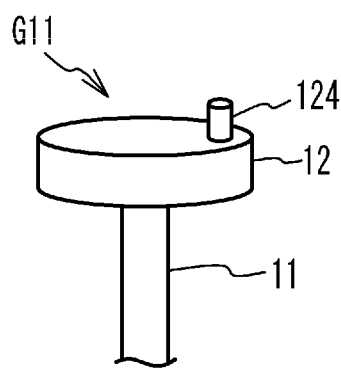

FIG. 12 is a cross-section diagram illustrating the structure in which the rotation part 3 and the dome 10a, overlap each other. The rotation part 3 is provided with the recesses 31b. Since each recess 31b is a hole with a bottom, the strength of the rotation part 3 having the recess 31b is improved as compared with the rotation part 3 having the opening 31 without the bottom. The recess 31b is an example of the hole.

The rotation part 3 rotates in conjunction with the operation part 1 since the protrusion 13 or 13a contact the edges of the openings 31 or the recesses 31a or 31b according to the rotation of the operation part 1. Each opening 31 or each recess 31a or 31b is formed in the range in which the protrusion 13 or 13a is movable by the tilt of the operation part.

According to the above configuration, the pointing devices 200 and 201 can be rotated by the interlocking of the operation part 1 and the rotation part 3. Since the rotation of the rotation part 3 by the tilt of the operation part 1 is suppressed, the rotation is not detected even when the operator tilts the operation part 1. Therefore, according to the pointing devices 200 and 201, it is possible to realize the tilt and the rotation operations with high accuracy without using complicated structure.

According to the pointing device 201, since the dome 10a overlaps the inside of the rotation part 3, the dome 10a can be made smaller than the dome 10, and the pointing device 201 can be reduced in height.

A description will be given of examples of the shape of the knob 12.

FIGS. 13A to 13E are perspective views illustrating examples of the knob 12. FIGS. 13A to 13E illustrates knobs G7 to G11 that improve operability ergonomically, for example.

A recess 120 is provided on an upper surface of the knob G7. The recess 120 is formed so as to fit the fingertip of the operator, and the operator can easily tilt the operation part 1.

Projections 121 that function as a slip stopper are provided on an upper surface of the knob G8. The projections 121 suppress an operator's erroneous operation.

Linear projecting parts 122 extending radially from the center are provided on an upper surface of the knob G9. The projecting parts 122 suppress the operator's erroneous operation.

A projecting part 123 extending in a spiral shape is provided on a side surface of the knob G10. When the operator picks and rotates the knob G10 with fingers, the projecting part 123 fits the fingers to be entangled with the fingers, so that a highly accurate rotation operation is possible. An upper surface of the knob G10 may have the shapes of the knobs G7 to G9, and the knob G11 described later.

A protrusion 124 protruding upward is provided at an end of an upper surface of the knob G11. The operator can easily rotate the knob G11 by rotating the protrusion 124 while holding the protrusion 124 with the finger.

Figure 14:
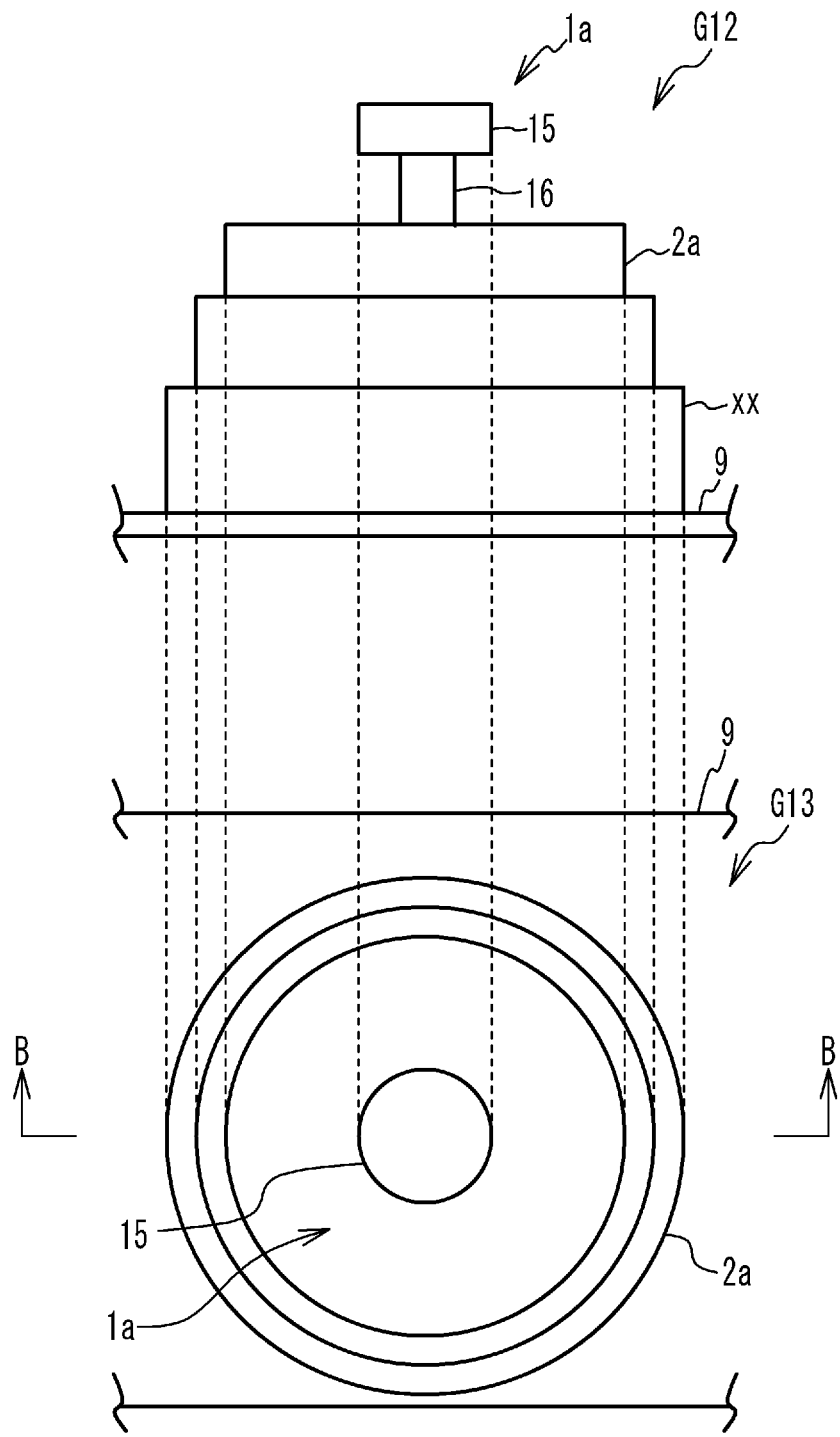
FIG. 14 is an appearance diagram illustrating another example of the pointing device.

FIG. 14 is an appearance diagram illustrating a pointing device 202. A code G12 indicates a side surface of the pointing device 202, and a code G13 indicates an upper surface of the pointing device 202.

Figure 15:
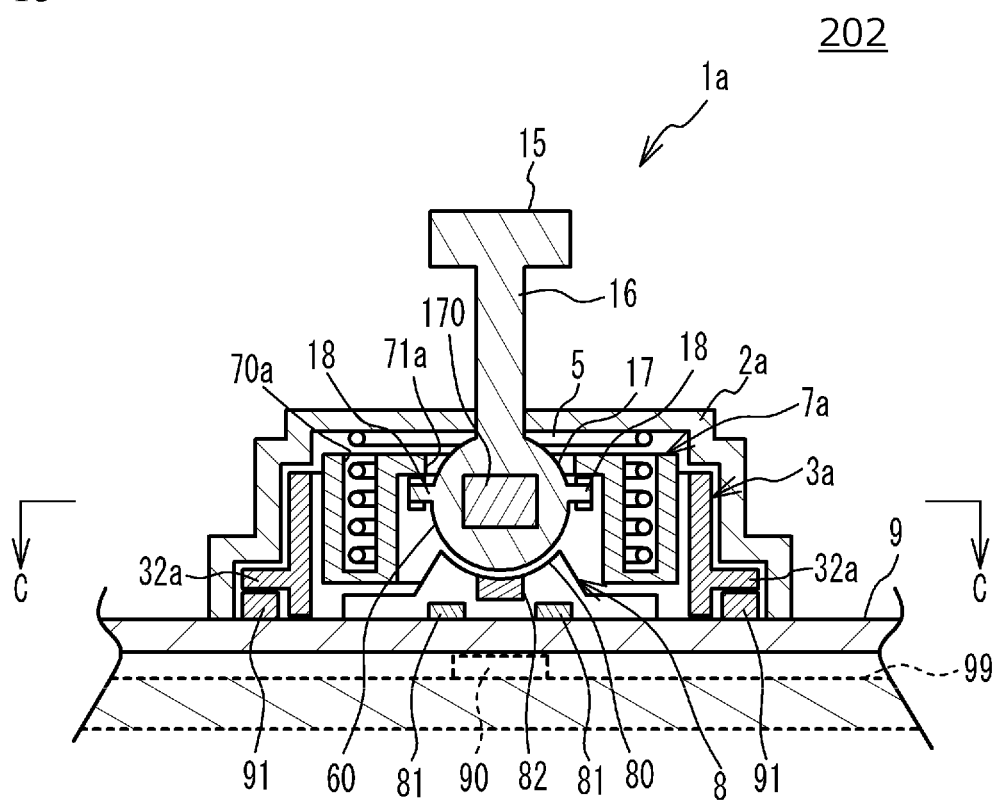
FIG. 15 is a cross-section diagram illustrating another example of the pointing device.

FIG. 15 is a cross-section diagram of the pointing device 202 taken along a line B-B in FIG. 14. In FIG. 15, the same elements as in FIG. 2 are denoted by the same reference numerals, and description thereof is omitted.

The pointing device 202 includes an operation part 1a, a case 2a, a rotation part 3a, the spring 5, a slider 7a, the receiving part 8, and the substrate 9. The operation part 1a includes a shaft 16 and a knob 15 provided at an end of the shaft 16. The case 2a is fixed to the substrate 9.

The operation part 1a is an example of the operation member, and includes a spherical base 17, the shaft 16 extending from the base 17, and the knob 15 provided at the tip of the shaft 16. In the operation part 1a, the knob 15 is connected to the tip of the shaft 16. The knob 15 may have any of the shapes shown in FIGS. 13A to 13E, but the shape of the knob 15 is not limited to these.

The base 17 is placed in the recess 80 so as to be liftable with respect to the substrate 9. The surface of the recess 80 is formed so as to match a curved surface of the base 17. A permanent magnet 170 is embedded in the base 17. The tilt angle of the base 17 is detected by detecting the change in the magnetic field of the permanent magnet 170 with the magnetoelectric conversion element 81.

The base 17 is housed in the slider 7a. The slider 7a is an example of a housing member, is a double cylindrical member similar to the slider 7, and has a groove 70a along the outer periphery. The groove 70a houses the spring 5 that applies a biasing force to the slider 7a to maintain the posture of the operation part 1a.

An upper end of the spring 5 is in contact with the inner surface of the case 2a, and the slider 7a is biased toward the substrate 9. Protrusions 18 are provided on the outer periphery of the base 17 at equal intervals. When the base 17 is tilted, the protrusions 18 contact the edge of an opening 71*a* provided at an upper end of the slider 7*a*. At this time, the protrusions 18 are pushed toward the substrate 9 by the biasing force. Thus, the slider 7*a* holds the posture of the operation part 1*a* by biasing the protrusions 18 toward the substrate 9.

The slider 7*a* is housed in the cylindrical rotation part 3*a*. The rotation part 3*a* is not fixed to the substrate 9 and the case 2*a*, is provided rotatably clockwise or counterclockwise along the surface of the substrate 9, and rotates in conjunction with the rotation of the slider 7*a*.

Figure 16:
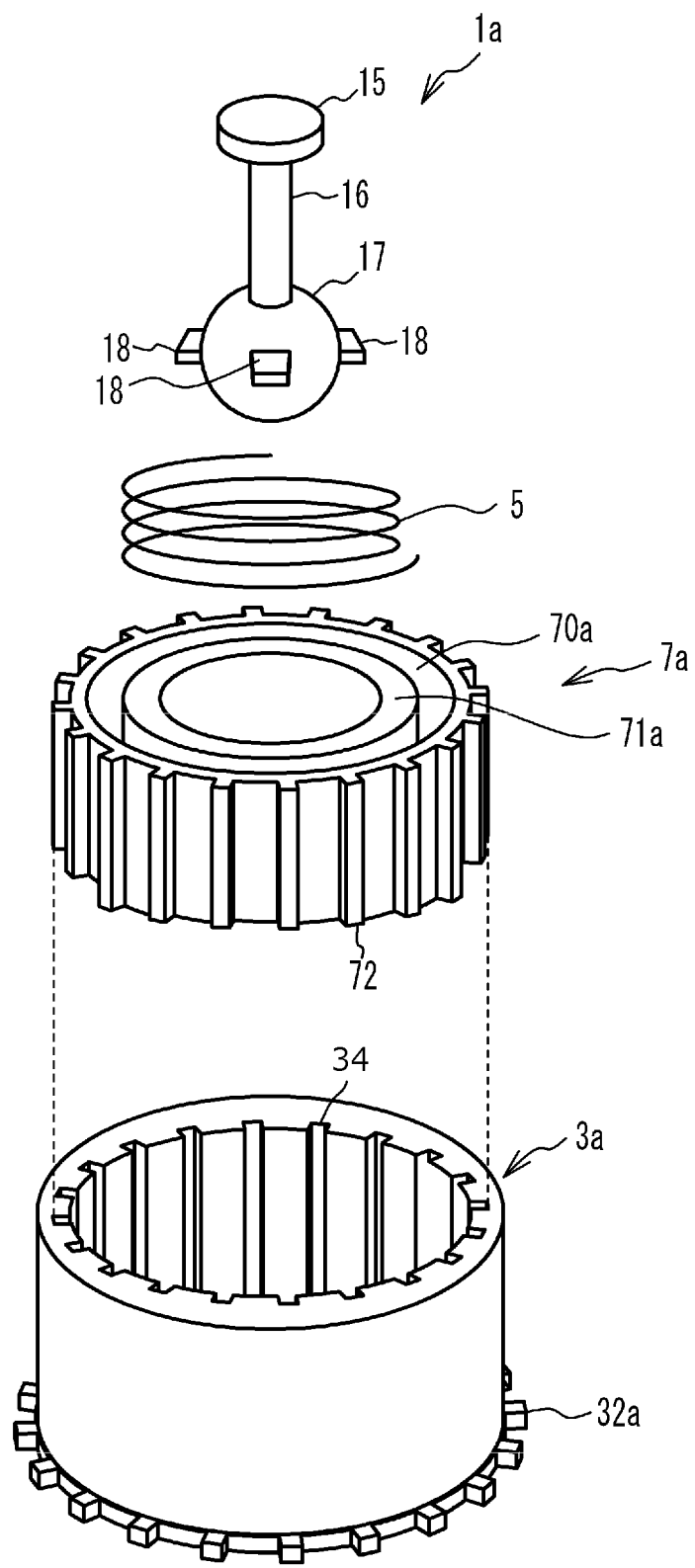
FIG. 16 is a perspective view illustrating the operation member, a spring, a slider and the rotation member.

FIG. 16 is a perspective view illustrating the operation part 1*a*, the spring 5, the slider 7*a* and the rotation part 3*a* to be housed in the case 2. The base 17 is held in the opening 71*a*. The protrusions 18 are provided on the outer periphery of the base 17 every 90 degrees. The spring 5 is housed in the groove 70*a*, and biases the slider 7*a* toward the substrate 9.

A recessed and projecting part 72 is provided on the outer peripheral surface of the slider 7*a*. The recessed and projecting part 72 is formed by, for example, parallel grooves extending in a direction substantially perpendicular to the substrate 9. The slider 7*a* is housed in the rotation part 3*a*.

A recessed and projecting part 34 formed by parallel grooves extending in a direction substantially perpendicular to the substrate 9 is provided on an inner peripheral surface of the rotation part 3*a*. The inner peripheral surface of the rotation part 3*a* faces the outer peripheral surface of the slider 7*a* when the slider 7*a* is housed in the rotation part 3*a*, and the recessed and projecting parts 72 and 34 of the slider 7*a* and the rotation part 3*a* are engaged with each other. The rotation of the slider 7*a* is transmitted to the rotation part 3*a* by the recessed and projecting parts 72 and 34 engaging with each other.

A recessed and projecting part 32*a* for detecting the rotation of the rotation part 3*a* is provided on an outer peripheral surface of the rotation part 3*a*. The optical sensor 91 outputs a pulse signal corresponding to the position or rotation of the recessed and projecting part 32*a*, and the rotation amount of the rotation part 3*a* can be detected based on the pulse signal. As is the case of FIG. 8, holes may be provided in the rotation part 3*a* instead of the recessed and projecting part 32*a*.

The slider 7*a* rotates in conjunction with the rotation of the operation part 1*a*. Hereinafter, a description will be given of the operations of tilting and rotating the operation part 1*a*.

Figure 17:
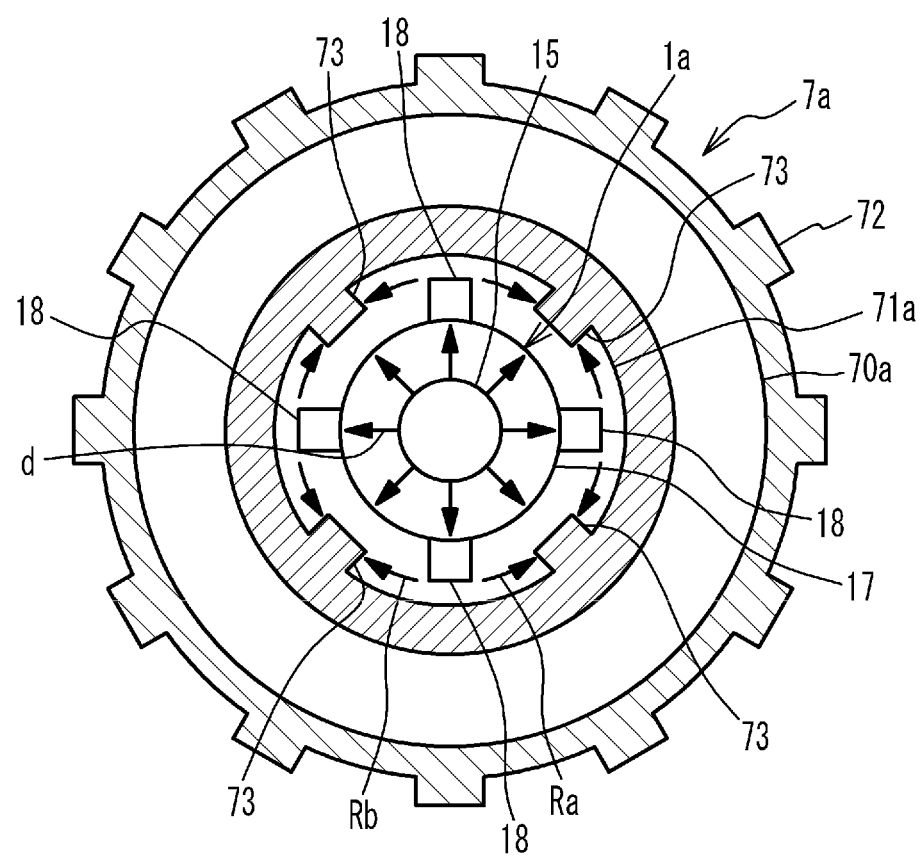
FIG. 17 is a diagram illustrating the movement of the protrusion when the operation member is tilted.

FIG. 17 illustrates the movement of the protrusions 18 when the operation part 1*a* is tilted. FIG. 17 is a cross-section diagram taken along a line C-C in FIG. 15.

The operator can tilt the knob 15 in any direction as indicated by radial arrows d. When the knob 15 is tilted, the base 17 is also tilted. Therefore, there is a possibility that the protrusions 18 move inside the slider 7*a* in circumferential directions as indicated by arrows Ra and Rb.

However, even when the knob 15 is tilted to the movable limit, the protrusion 18 does not contact and press protrusions 73. This is because the protrusions 73 are formed so as to avoid the range in which the protrusions 18 are movable by the tilt of the operation part 1. Therefore, it is suppressed that the protrusions 18 pushes the protrusions 73 to rotate the slider 7*a* by the tilt of the operation part 1*a*.

Figure 18:
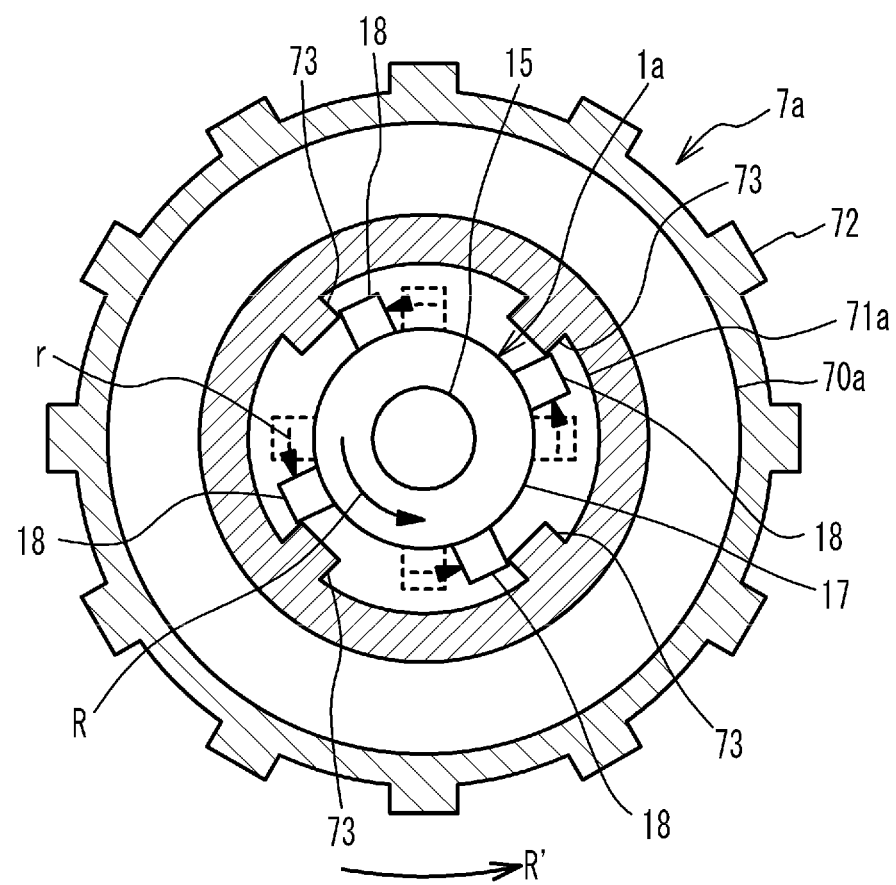
FIG. 18 is a diagram illustrating the movement of the protrusion when the operation member is rotated.

FIG. 18 illustrates the movement of the protrusions 18 when the operation part 1*a* is rotated. FIG. 18 is a cross-section diagram taken along the line C-C in FIG. 15.

The operator can rotate the knob 15 regardless of the tilt of the operation part 1*a*. When the knob 15 rotates counterclockwise as indicated by an arrow R, the base 17 also rotates, and each protrusion 18 moves from a position indicated by a dotted line in a direction indicated by an arrow r.

At this time, the moved protrusions 18 come into contact with the protrusions 73 protruded from the slider 7*a*, For this reason, the slider 7*a* is pushed by the rotation of the protrusions 18, and is rotated in a direction R'. Therefore, the pointing device 202 can rotate the slider 7*a* in conjunction with the rotation of the operation part 1*a*, and has the same effects as the pointing devices 200 and 201.

When the slider 7*a* is rotated, the rotation part 3*a* is also rotated by the recessed and projecting parts 72 and 34 engaged with each other. Since the optical sensor 91 outputs the pulse signal corresponding to the detection of the recessed and projecting part 32*a* according to the rotation of the rotation part 3*a*, the rotation amount can be detected by the pulse signal.

Figure 19:
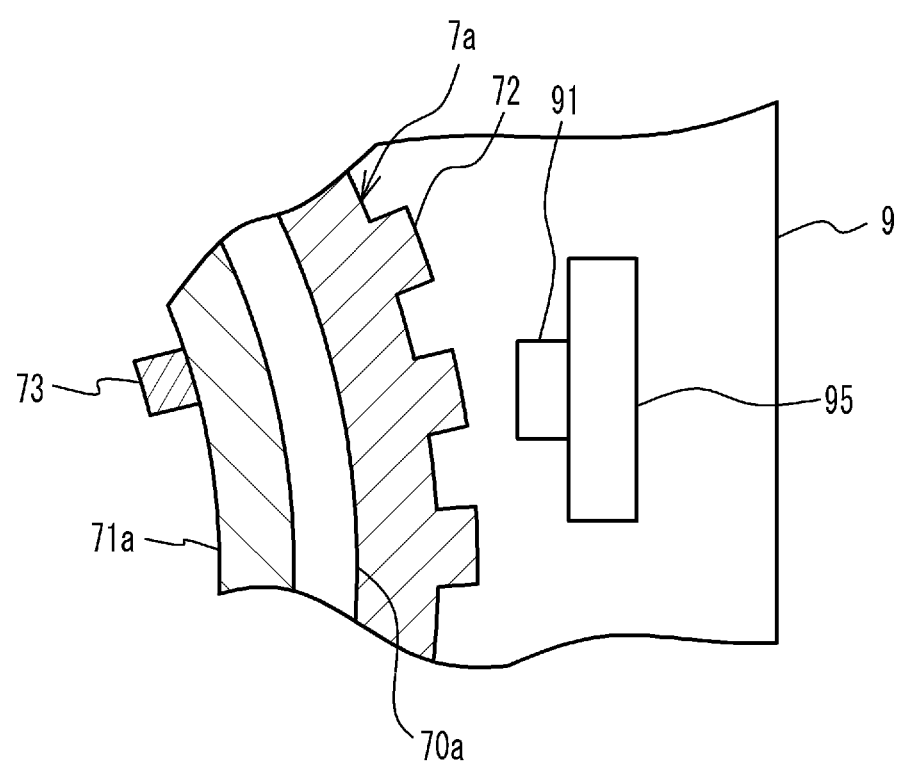
FIG. 19 is a diagram illustrating a structure in which an optical sensor detects a recessed and projecting part of the slider.

The optical sensor 91 may detect the recessed and projecting part 72 instead of the recessed and projecting part 32*a*. FIG. 19 illustrates an example of a structure in which the optical sensor 91 detects the recessed and projecting part 72. FIG. 19 illustrates the vicinity of the recessed and projecting part 72 in the C-C cross section of FIG. 15. In FIG. 19, the rotation part 3*a* and the case 2*a* are omitted.

A sub-substrate 95 is erected on the substrate 9 so as to face the outer peripheral surface of the slider 7*a*. The optical sensor 91 that faces the recessed and projecting part 72 and detects the recessed and projecting part 72 according to the rotation of the slider 7*a* is mounted on the sub-substrate 95. The rotation amount of the slider 7*a* can be detected by the pulse signal output from the optical sensor 91 in response to the detection of the recessed and projecting part 72. The optical sensor 91 is an example of a detector.

According to this example, the rotating part 3*a* is not necessary, and a space required for mounting the pointing device 202 is reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A pointing device comprising:
   a substrate;
   an operation member that is provided tiltably with respect to the substrate, and includes a protrusion protruded from any one of an inner wall and an outer wall; and
   a rotation member that is provided rotatably on the substrate, and includes a hole in which the protrusion enters when the rotary member overlaps the operation member;
   wherein the rotation member rotates in conjunction with the operation member when the protrusion contacts an edge of the hole according to rotation of the operation member, and
   the hole is formed so that the protrusion does not contact the edge of the hole even when the operation member is tilted to a movable limit.

* * * * *